United States Patent [19]

Rodini

[11] Patent Number: 5,091,456
[45] Date of Patent: Feb. 25, 1992

[54] ARAMID FIBER OF IMPROVED HYDROLYTIC STABILITY

[75] Inventor: David J. Rodini, Midlothian, Va.

[73] Assignee: E. I. du Pont de Nemours and Company, Wilmington, Del.

[21] Appl. No.: 575,544

[22] Filed: Aug. 30, 1990

[51] Int. Cl.$^5$ .......................... C08K 5/02; C08K 5/05; C08K 5/06
[52] U.S. Cl. ..................................... 524/366; 524/380
[58] Field of Search ................................ 524/380, 366

[56] References Cited

U.S. PATENT DOCUMENTS

| | | | |
|---|---|---|---|
| 3,245,944 | 4/1966 | Middleton | 524/380 |
| 3,326,846 | 6/1967 | Pascal | 524/380 |
| 3,756,908 | 9/1973 | Gross | 162/146 |
| 3,767,756 | 10/1973 | Blades | 264/184 |

OTHER PUBLICATIONS

"Krytox Fluorinated Oils", pp. 1-6, Publication by the Dupont Company.

Primary Examiner—Paul R. Michl
Assistant Examiner—Edward J. Cain

[57] ABSTRACT

The addition of certain fluorinated additives to aramid spin dopes prior to fiber spinning provides fiber of improved hydrolytic stability.

7 Claims, No Drawings

ARAMID FIBER OF IMPROVED HYDROLYTIC STABILITY

BACKGROUND OF THE INVENTION

Poly(p-phenylene terephthalamide) (PPD-T) and poly(m-phenylene isophthalamide) (MPD-I) belong to a class of materials referred to as aramids. PPD-T fiber is well-known for its high strength and finds extensive use as reinforcement material in rubber, composites etc. MPD-I fiber is well-known for its fire resistance and is used, for example, in filter bags at electric power generation plants and protective clothing.

When exposed to moisture, acids or bases at elevated temperatures, aramid fibers will lose tenacity. For certain end-use applications, it is, therefore, desirable that the aramid fiber have greater resistance to hydrolysis. These applications include reinforcement for coolant hose in automobiles, oil-transport hose and belts. An object of the present invention is to obtain significant improvement in hydrolysis resistance of aramid fiber.

SUMMARY OF THE INVENTION

The present invention provides aramid fiber of improved hydrolysis resistance containing dispersed throughout the fiber, a minor amount, preferably from about 0.5 to 3.0% of bis(trifluoromethyl) benzyl alcohol or a polymer of the formula.

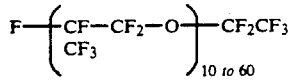

based on the weight of the fiber. Preferably the aramid fiber is poly(p-phenylene terephthalamide). Also encompassed by this invention is a process for preparing the fiber.

DETAILED DESCRIPTION OF THE INVENTION

The present invention is based on the discovery that aramid fiber containing certain fluorinated compounds dispersed throughout the fiber can be prepared and that such fiber possesses improved hydrolysis resistance. The fiber of most interest is PPD-T fiber. This fiber is often used as reinforcement for rubber-based articles which are exposed to hot water, acids or bases. It has now been found that if the fiber contains dispersed throughout, a minor amount of certain fluorinated compounds, it will retain significantly more of its strength upon exposure to hydrolyzing media than if the additive were not present. Improved results have also been obtained with MPD-I fiber.

The fluorinated additive is conveniently incorporated in the spinning of the fiber. Attempts to achieve the desired result by topical treatment were not successful. Typical procedures for spinning of PPD-T are disclosed in Blades U.S. Pat. No. 3,767,756 while the spinning of MPD-I is exemplified in Gross U.S. Pat. No. 3,756,908. In practice, the fluorinated additive in neat form is added to the spin dope in proportions, based on the polymer content, comparable to the proportions desired in the spun fiber. A slight excess should be added because some of the additive is lost in the spinning process. In this regard, it has been found that bis(-trifluoromethyl) benzyl alcohol is the less preferred among the useful additives. The fluorinated oils

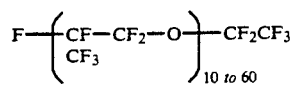

are available commercially from E. I. du Pont de Nemours & Co., Inc. and are designated Krytox® 143 Fluorinated Oils. They are low molecular weight, fluorine end-capped, homopolymers of hexafluoropropylene epoxide. The spin dope containing the additive is then spun and processed in the conventional manner.

The fluoroadditives are normally added to a thoroughly mixed spin dope of PPD-T polymer in sulfuric acid, as for example, a dope of PPD-T polymer of 6.0 inherent viscosity in 99.7% $H_2SO_4$ at a concentration of 46 gm polymer in 100 ml acid. The mixture is stirred, subjected to vacuum to remove entrapped air bubbles and extruded through a 5 mm layer of air in 1° C. water in a spin tube similar to that shown in FIG. 1 of U.S. Pat. No. 3,767,756.

In the case of MPD-I polymer, the procedure of U.S. Pat. No. 3,756,908 is generally followed with the fluoroadditive incorporated into the spin dope shortly before spinning. A typical procedure involves preparing a spin dope of MPD-I having an inherent viscosity of about 1.5 in a solution containing 67% dimethyl acetamide, 9% calcium chloride and 4% water. To this is added the fluoroadditive with mixing and the dope dry spun as described at the bottom of column 5 to column 6 of U.S. Pat. No. 3,756,908. The fibers were tested for hydrolytic stability by the procedure described below.

MEASUREMENT AND TEST PROCEDURES

Hydrolytic Test

Fibers are wound on a TEFLON bar measuring 6 in × 0.5 in × 0.25 in. Slots are made in the top of the bar in order to facilitate the placing of fiber on the bar. Approximately 6 ft of fiber is wound on the bar at a time. Usually 5 TEFLON bars wound with fiber are prepared at a time. The bars are then placed into thick walled Pyrex tubes measuring 11 in long × 0.5 in diameter. Next the hydrolysis test media is placed into the tube. A variety of solutions can be used, e.g. water, pH buffer solutions, etc. The Pyrex tube is flame sealed and placed into a containment vessel to minimize damage in the event the tubes explode. The samples are placed in an oven. The oven can be set to any temperature, however, 120° C. is the temperature used most often. Tubes are removed periodically. The fiber samples are removed from the TEFLON bar and 1 in filament tenacities are measured.

Tenacity

Tenacities were measured on 1 inch fiber lengths. Deniers were measured using a "Vibroscope" according to American National Standard Test Method (ASTM) D-1577-79. Tensiles were measured according to ASTM D 2101-82.

The following examples, except for the comparative example and controls are intended to illustrate the invention and are not to be construed as limiting.

EXAMPLE 1

Fibers were extruded from a PPD-T/H$_2$SO$_4$ spin dope that contained about 1% by wt., based on the PPD-T, of bis(trifluoromethyl) benzyl alcohol. There was approximately 20% by wt. of PPD-T in the spin dope which was spun as described in Blades U.S. Pat. No. 3,767,756. The as-spun fiber which contained about 0.5% of additive was then tested for hydrolytic stability in steam at 148° C. in an autoclave with the following results shown in Table 1.

TABLE 1

Hydrolytic Stability of Fluoroalcohol containing PPD-T

| Time (Hours) | % Strength Retained Control | % Strength Retained PPD-T plus Fluoroalcohol |
|---|---|---|
| 0 | 100 | 100 |
| 24 | 70 | 88 |
| 48 | 48 | 81 |
| 72 | 30 | 76 |
| 90 | 17 | 70 |

EXAMPLE 2

Following a process similar to Example 1, fluorinated oil (KrytoxR 143 AD) having a number average molecular weight MW of about 8250 was incorporated into the PPD-T/H2SO4 spin dope in place of the bis(trifluoromethyl) benzyl alcohol. About 2.5% by wt. of the additive based on the wt. of PPD-T was added. The as-spun fiber retained more than 80% of the additive. A portion of the as-spun fiber was heated at 400° C. for 4 seconds through a stainless steel tube under 0.7 gpd tension as described in Blades U.S. Pat. No. 3,869,430. Both the as-spun and heat treated (HT) fibers were tested for hydrolytic stability in pH 7 buffer solution (120° C.). The results appear in Table 2.

TABLE 2

Hydrolytic Stability of Fluorinated Oil Containing Fiber

| | Control | | As-Spun PPD-T w/KrytoxR | |
|---|---|---|---|---|
| Time (hours) | Tenacity (gpd) | % Strength Retained | Tenacity (gpd) | % Strength Retained |
| 0 | 26.64 | 100 | 23.59 | 100 |
| 48 | 12.26 | 46 | 16.70 | 71 |
| 744 | 11.06 | 42 | 12.84 | 55 |

| | (HT) As-Spun PPD-T w/KrytoxR | |
|---|---|---|
| Time (hours) | Tenacity (gpd) | % Strength Retained |
| 0 | 23.9 | 100 |
| 48 | 23.76 | 99 |
| 744 | 18.00 | 75 |

EXAMPLE 3

To determine the effect of bis(trifluoromethyl) benzyl alcohol and fluorinated oil KrytoxR 143 AD on the hydrolytic resistance of MPD-I fiber, each of these additives were combined with a spin dope of MPD-I in dimethylacetamide (DMAc). The dope was spun by the conventional dry spinning method, then drawn and crystallized. The spin dope contained about 19.5% of polymer. About 1.5% of additive was incorporated, based on the wt. of polymer, into each spin dope. The tests were performed at 140° C. in pH 1 buffer solution. The results appear in Table 3.

TABLE 3

Hydrolytic Stability of MPD-I Containing Fluoroadditives

| | MPD-I Control | | MPD-I w/Fluoroalcohol | |
|---|---|---|---|---|
| Time (hours) | Tenacity (gpd) | % Strength Retained | Tenacity (gpd) | % Strength Retained |
| 0 | 5.37 | 100 | 5.09 | 100 |
| 168 | 2.22 | 41 | 2.20 | 44 |

| | MPD-I w/Fluorinated Oil | |
|---|---|---|
| Time (hours) | Tenacity (gpd) | % Strength Retained |
| 0 | 5.63 | 100 |
| 168 | 3.57 | 63 |

COMPARATIVE EXAMPLE A

Topical Application of Fluoroalcohol and Fluorinated Oil to Never Dried PPD-T Fibers Ten percent solutions of 1% bis(trifluoromethyl) benzyl alcohol and fluorinated oils Krytox ® 143 AB, AC and AD having number weight MW of about 3700, 6250 and 8250 respectively, were made up in Freon ® 113. These solutions were applied separately to never dried PPD-T yarns. A 1% level of additive was applied to 1500 denier spun PPD-T yarns. Following the application of these coatings, the fibers were heat treated using a 1 ft. tube oven at 550° C., at a windup speed of 7 m/min and tension of 3300 g. Retention of the coating materials was >60%. The PPD-T yarns were not dried prior to topical application in order to promote absorption of the additives. Samples of the coated fibers were then tested in a H$_2$S/H$_2$O solution (pH=3) at 120° C. This data is shown in Table A. Topical application of bis(trifluoromethyl) benzyl alcohol or fluorinated oil followed by fiber heat treatment does not significantly improve PPD-T hydrolytic stability.

TABLE A

% Strength Retained for Coated Fibers

| Time (hours) | KrytoxR143AB | KrytoxR143AC |
|---|---|---|
| 0 | 100 | 100 |
| 24 | 65 | 69 |
| 168 | 66 | 92 |

| Time (hours) | KrytoxR143AD | FA* | Control |
|---|---|---|---|
| 0 | 100 | 100 | 100 |
| 24 | 94 | 99 | 76 |
| 168 | 73 | 75 | 77 |

*bis(trifluoromethyl) benzyl alcohol

What is claimed is:

1. An aramid fiber of improved hydrolysis resistance containing dispersed throughout the fiber, from 0.5 to 3% of bis(trifluoromethyl) benzyl alcohol or a polymer of the formula

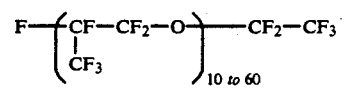

based on the weight of the fiber.

2. A fiber according to claim 1 wherein the aramid is poly(p-phenylene terephthalamide).

3. A fiber according to claim 2 wherein the additive is bis(trifluoromethyl) benzyl alcohol.

4. A fiber according to claim 2 wherein the additive is

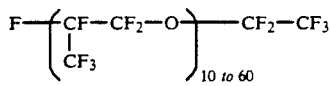

5. A fiber according to claim 1 wherein the aramid is poly(m-phenylene isophthalamide).

6. A process of preparing the fiber of claim 1 comprising incorporating the additive into a spin dope of the aramid and spinning the dope into fiber.

7. A process of preparing the fiber of claim 2 comprising incorporating bis(trifluoromethyl) benzyl alcohol or

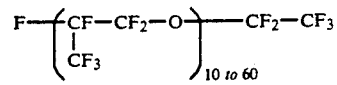

into a spin dope of the poly(p-phenylene terephthalamide) in $H_2SO_4$ and spinning it into fiber.

* * * * *